Patented Jan. 8, 1952

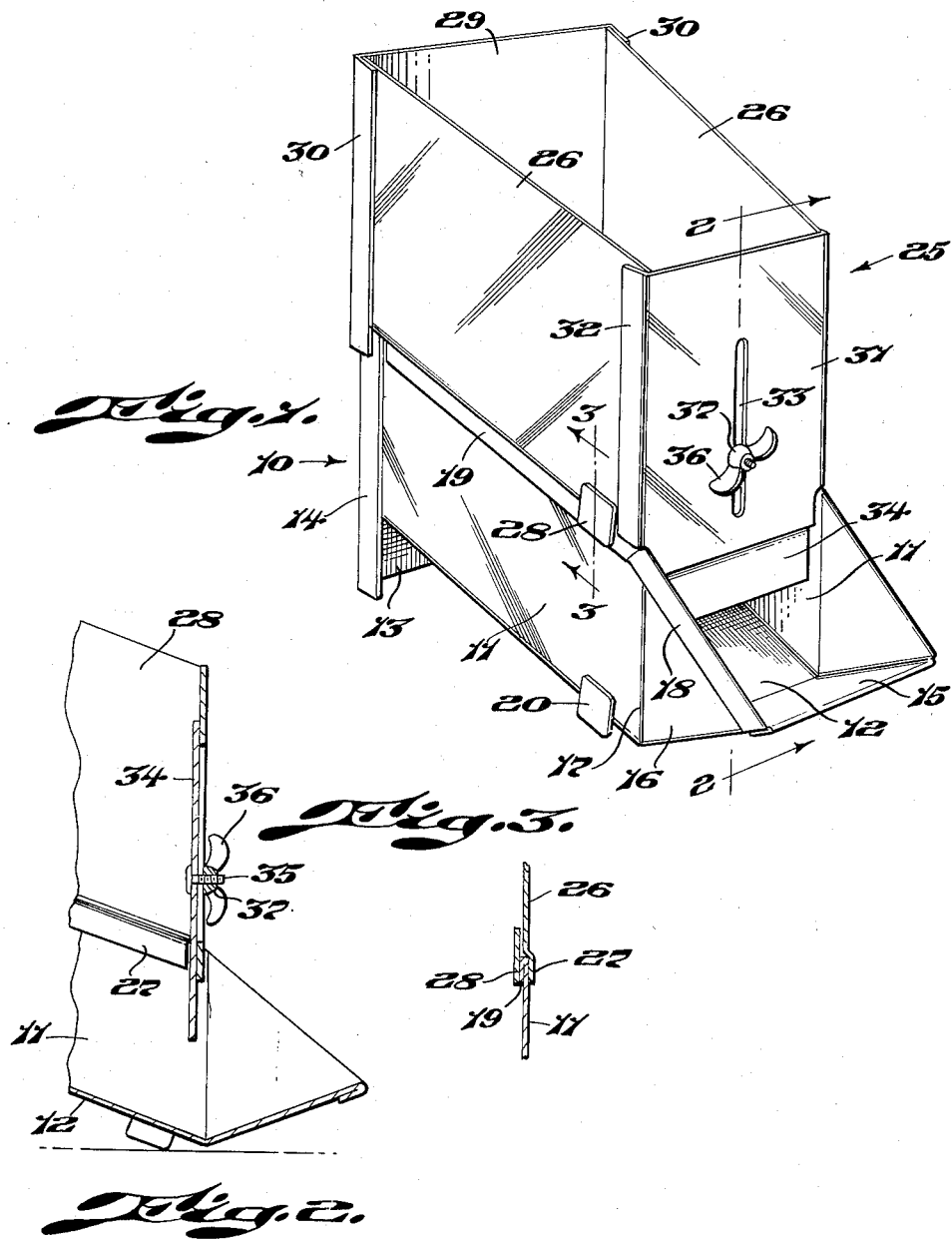

2,582,207

UNITED STATES PATENT OFFICE 2,582,207

OPEN-TOPPED RECEPTACLE AND A HOPPER EXTENDING UPWARDLY THEREFROM, BOTH FORMING A STACKABLE UNIT

Thomas Shaw, Cranston, R. I., assignor to Stackbin Corporation, a corporation of Rhode Island Application September 9, 1948, Serial No. 48,411

6 Claims. (Cl. 222—143)

This invention relates to a receptacle of the type utilized for holding a multiplicity of small parts for the convenience of an assembler in using the parts for assembling them with other parts.

Heretofore it has been usual to provide bins or receptacles having an open mouth for containing a multiplicity of parts with several units or bins arranged in close proximity so that an assembler may pick one piece from one bin and a different piece from a different bin and assemble these together. The bins have been such that they may be stacked one upon the other and arranged side by side either throughout an arc or in a straight line.

One of the objects of this invention is to provide a hopper by which each of the bins may have its capacity increased.

Another object of the invention is to provide a hopper for each bin, which hopper may be used as a unit in the stacking of bins and hoppers one upon the other.

Another object of this invention is to provide a hopper which will have a sliding front wall so that where a multiplicity of the parts are of very small size, their flow to the delivery mouth may be better controlled.

With these and other objects in view, the invention consists of certain novel features of construction, as will be more fully described and particularly pointed out in the appended claims.

In the accompanying drawings:

Figure 1 is a perspective view showing a receptacle or bin with a hopper mounted upon it;

Figure 2 is a sectional view on line 2—2 of Figure 1; and

Figure 3 is a sectional view on line 3—3 of Figure 1 showing a fragmental portion of the hopper and bin.

In proceeding with this invention, I provide a hopper which will generally conform to the shape of the bin upon which it is to be mounted and form an extension of the walls thereof upwardly therefrom. Means are provided for snugly mounting the hopper on the bin with the edges interlocking and a slide is provided on the front wall of the hopper which may extend into the bin to control the delivery mouth of the bin or receptacle.

With reference to the drawings, 10 designates generally a bin or receptacle which has opposite side walls 11 and an inclined bottom wall 12 which is positioned so that its rear end is higher than its front end by means of a back wall which extends to provide a leg 13 beneath the bottom wall 12. This back wall and leg are flanged at their opposite edges as at 14 to lap over the side walls 11 and are secured thereto by any suitable means such, for instance, as welding. A delivery mouth is provided at the forward end of the bin or receptacle 10 providing an upwardly inclined lip 15 with opposite sides 16 being jointed to the side walls as at 17 and reenforced by folding over of the edges thereof as at 18. The arrangement is such that small parts when placed in the bin will slide down the inclined bottom wall 12 but come to rest at the lip 15 which extends upwardly on an opposite incline. Side walls are also reenforced by folding outwardly the upper edges thereof as at 19 and tabs 20 may be secured by welding to the side walls to provide a guide and mounting means for mounting the bin upon another like bin, and for this purpose the side walls of the bin are tapered so that their upper edge is of a dimension less than the lower edge.

The back wall and leg are formed of one piece of stock, and the remainder of the bin, except tabs 20, is formed from another single piece of stock.

The hopper which is designated generally 25 has opposite side walls 26 which at their lower edges are deflected inwardly as at 27 (see Figure 3) so as to extend inside of the side walls 11 of the bin or receptacle 10. Thus, the side walls 26 may be mounted upon the side walls 11, as shown in Figure 3, to be extensions thereof, and in order that they may be more securely held in position than by the inwardly deflected edges 27, I provide tabs 28 secured to the walls 26 such as by welding to extend along the outer surface of the side walls 11 and form a rather snug connection with the reenforced portion 19 thereof. A back wall 29 joins the side walls 26 and is flanged as at 30 to extend along and be secured to the side walls such as by welding. This back wall has its flanges 30 spaced from the inwardly deflected portion 27 so as to provide a recess into which the upper edge of the receptacle or bin may extend when the hopper is mounted thereon.

A front wall 31 is flanged as at 32 so that these flanges extend along the surfaces of the side walls 26 and are secured thereto by welding. These flanges are substantially co-extensive with the non-deflected portion of the wall 26.

A slot 33 is provided in the wall 31 and a slide 34 is located just inside of the wall 31 and is provided with a threaded pin 35 secured to the slide with this pin extending through the slot 33. A wing nut 36 is in threaded engagement with the threaded pin 35 and when screwed up thereon will have its hub portion 37 engage the margins of the slot 33 so as to draw the slide 34 against the inner surface of the wall 31 and bind it in position. This slide is of a width substantially the distance between the walls 11 of the bin and may be dropped into the bin so as to control the delivery mouth of the bin. Thus, if a large number of rather heavy but small parts are located in the bin and hopper, the weight of these might force the small parts out through the delivery mouth and off of the lip 15. However, the slide 34 may be lowered to control this delivery mouth and thus prevent the discharge of such small parts from the bin and hopper.

The hopper is of such dimension with such taper that its upper end is smaller than its lower portion so as to receive upon it a bin such as designated 10 or the bin may be mounted below and the hopper upon it in a stacked relation. There may be a bin and hopper with another bin and hopper super-imposed on it and so on to the desired height.

In some cases where it is desired that the units be mounted side by side and still take an arcuate form, the front wall 31 will be of a dimension smaller than the back wall 29 and thus when placed side by side there will be an arcuate formation of the bins or bins and hoppers or stacks of bins and hoppers as may be desired, thus providing a very compact arrangement so that a multiplicity of parts may be provided for assembly all within the reach of the operator.

I claim:

1. In combination a unit receptacle of the type adapted to have one unit stacked upon another and having an open front for a delivery aperture, a hopper having open top and bottom and comprising an integral unit composed of end and side walls, said hopper provided with a lower edge of the walls of a shape to fit upon the unit receptacle and itself become a unit of the stack while its upper edge is shaped to fit the lower part of a unit receptacle and thus adapted to have a unit receptacle mounted upon it, the front wall of the hopper extending down into the receptacle to partly close said open front.

2. In combination a unit receptacle of the type adapted to have one unit stacked upon another and having an open front for a delivery aperture, a hopper having open top and bottom and comprising an integral unit composed of end and side walls, said hopper provided with a lower edge of the walls of a shape to fit upon the unit receptacle and itself become a unit of the stack while its upper edge is shaped to fit the lower part of a unit receptacle and thus adapted to have a unit receptacle mounted upon it, the front wall of the hopper provided with a slide to be vertically lowered into or lifted out of the receptacle to close or open the open front thereof.

3. In combination a unit receptacle of the type adapted to have one unit stacked upon another and having an open front for a delivery aperture, a hopper having open top and bottom and comprising an integral unit composed of end and side walls, said hopper provided with a lower edge of the walls of a shape to fit upon the unit receptacle and itself become a unit of the stack while its upper edge is shaped to fit the lower part of a unit receptacle and thus adapted to have a unit receptacle mounted upon it, the front wall of the hopper provided with a slot, a slide, a threaded pin connected to said slide and engaging said slot to guide the movement of the slide, and a wing nut on the pin to hold the slide in adjusted position.

4. A hopper for a receptacle comprising integral back, front, and side walls forming a fence-like enclosure with an open bottom, and means carried by said walls for mounting the hopper on a similarly shaped receptacle having an open front for a delivery aperture to in effect enlarge the capacity of the receptacle on which the hopper is mounted by extending its walls upwardly, said front wall being provided with a portion extending downwardly beyond the adjoining sides to enter the open front of the receptacle and partially close the same.

5. A hopper for a receptacle comprising integral back, front, and side walls forming a fence-like enclosure with an open bottom, and means carried by said walls for mounting the hopper on a similarly shaped receptacle having an open front for a delivery aperture to in effect enlarge the capacity of the receptacle on which the hopper is mounted by extending its walls upwardly, said front wall being provided with a slide to be vertically moved thereon to close the open front of the receptacle on which it is mounted.

6. A hopper for a receptacle comprising integral back, front, and side walls forming a fence-like enclosure with an open bottom, and means carried by said walls for mounting the hopper on a similarly shaped receptacle having an open front for a delivery aperture to in effect enlarge the capacity of the receptacle on which the hopper is mounted by extending its walls upwardly, said front wall being provided with a slot, a slide having a threaded pin in said slot and a wing nut to engage the pin and hold the slide in adjusted position on said front wall.

THOMAS SHAW.

REFERENCES CITED

The following references are of record in the file of this patent:

UNITED STATES PATENTS

| Number | Name | Date |
|---|---|---|
| 164,218 | Scannell | June 8, 1875 |
| 226,266 | Bergstresser | Apr. 6, 1880 |
| 268,531 | Rakow | Dec. 5, 1882 |
| 383,344 | Conwell | May 22, 1888 |
| 502,347 | Cell et al. | Aug. 1, 1893 |
| 917,804 | Sedgwick | Apr. 13, 1909 |
| 987,388 | Marsh | Mar. 21, 1911 |
| 1,041,016 | Butts | Oct. 15, 1912 |
| 1,110,018 | Van Schoiack | Sept. 8, 1914 |
| 1,116,752 | Stolk | Nov. 10, 1914 |
| 1,156,194 | Washburne | Oct. 12, 1915 |
| 1,803,566 | Sexton | May 5, 1931 |
| 1,865,736 | Astley | July 15, 1932 |
| 2,147,849 | Leo | Feb. 21, 1938 |
| 2,320,388 | Shaw | June 1, 1943 |
| 2,344,448 | Oakes | Mar. 14, 1944 |
| 2,364,007 | Stanton | Nov. 28, 1944 |
| 2,440,056 | McIntyre et al. | Apr. 20, 1948 |

FOREIGN PATENTS

| Number | Country | Date |
|---|---|---|
| 177,781 | Switzerland | Aug. 16, 1935 |